United States Patent
Park et al.

(10) Patent No.: US 7,246,553 B2
(45) Date of Patent: Jul. 24, 2007

(54) BREAD MAKER

(75) Inventors: Jae-ryong Park, Suwon (KR); Yong-hyun Kwon, Suwon (KR); Chul Kim, Anyang (KR); Tae-uk Lee, Suwon (KR); Han-jun Sung, Suwon (KR); Jang-woo Lee, Suwon (KR); Dong-bin Lim, Suwon (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 253 days.

(21) Appl. No.: 10/804,052

(22) Filed: Mar. 19, 2004

(65) Prior Publication Data

US 2004/0221732 A1 Nov. 11, 2004

(30) Foreign Application Priority Data

May 7, 2003 (KR) .................. 10-2003-0029124

(51) Int. Cl.
*A21B 1/00* (2006.01)
*A23L 1/00* (2006.01)
(52) U.S. Cl. ............................. 99/348; 99/353; 126/194
(58) Field of Classification Search .................. 99/348, 99/353, 352, 426; 126/194; 219/739; 16/267, 16/268, 360, 374, 380; 49/371, 385, 398, 49/399
See application file for complete search history.

(56) References Cited

U.S. PATENT DOCUMENTS 1,646,644 A * 10/1927 Economides .................. 16/265
2,938,227 A 5/1960 Lhota
5,568,764 A 10/1996 Belongia et al.
6,025,581 A * 2/2000 Kang et al. .................. 219/739

FOREIGN PATENT DOCUMENTS

| CN | 1221870 A | 7/1999 |
|---|---|---|
| JP | 54-52375 | 4/1979 |
| JP | 55-50445 | 4/1980 |
| JP | 58-16813 | 2/1983 |
| JP | 08-322734 | 12/1996 |
| JP | 10-325547 | 12/1998 |
| JP | 11-241827 | 9/1999 |

(Continued)

OTHER PUBLICATIONS

European Search Report dated Aug. 3, 2004 (2 pp) for corresponding European Patent Application.

(Continued)

*Primary Examiner*—Reginald L. Alexander
(74) *Attorney, Agent, or Firm*—Staas & Halsey LLP

(57) ABSTRACT

A bread maker includes a frame, a bracket combined to a side part of the frame and formed with a combining hole, a door provided in front of the frame, and a door hinge combined to the door and formed with a combining projection rotatably combined to the combining hole of the bracket to allow the door to rotatably open and close. Accordingly, the bread maker has a simplified and a secure a door combination structure, thereby enhancing assembly efficiency and decreasing production cost. Further, the bread maker includes a bracket covered with a side cover when the door is open, thereby simplifying and improving the exterior appearance of the bread maker.

14 Claims, 7 Drawing Sheets

FOREIGN PATENT DOCUMENTS

| | | |
|---|---|---|
| JP | 2001-523444 | 11/2001 |
| KR | 97-14454 | 4/1997 |
| KR | 97-14489 | 4/1997 |
| KR | 1998-20483 | 7/1998 |
| KR | 127117 | 7/1998 |
| KR | 2000-1686 | 1/2000 |
| KR | 2000-10027 | 2/2000 |
| KR | 20-243635 | 8/2001 |
| KR | 2001-89904 | 10/2001 |
| KR | 2002-56629 | 7/2002 |

OTHER PUBLICATIONS

Chinese Office Action issued Sep. 9, 2005 for Application No. 2004100352079 (13 pp).

* cited by examiner

BREAD MAKER

CROSS-REFERENCE TO RELATED APPLICATIONS

This application claims the benefit of Korean Application No. 2003-29124, filed May 7, 2003, in the Korean Industrial Property Office, the disclosure of which is incorporated herein by reference.

BACKGROUND OF THE INVENTION

1. Field of the Invention

The present invention relates to a bread maker, and more particularly, to a bread maker having an improved door combination structure.

2. Description of the Related Art

Conventionally, a bread maker has been developed, which automatically performs a series of baking processes to allow a user to easily and conveniently make the bread.

FIG. 1 shows a conventional bread maker that comprises: a frame 1, a back cover 2 attached to a rear part of the frame 1, a side cover 3 attached to a side part of the frame 1, and a door 4 rotatably combined to the front of the frame 1. Moreover, a combination structure of a bracket 5 and a door hinge 6 is provided to allow the door 4 to open and close.

However, according to the conventional bread maker, the combination structure of the bracket 5 and the door hinge 6 is relatively complicated. As a result, assembly work is difficult, and a relatively large number of components are required.

Further, according to the conventional bread maker, the door hinge 6 is curved inward to prevent the door 4 from being blocked by the side cover 3 while the door 4 is opened and closed. However, the inward curved shape of the door hinge 6 causes the combination of the door 4 and the door hinge 6 to be relatively weak in comparison to the weight of the door 4.

Further, according to the structure of the conventional bread maker, the bracket 5 is exposed to the outside when the door 4 is open, resulting in a faster deterioration of the bracket 5 and a complex exterior appearance of the bread maker.

SUMMARY OF THE INVENTION

Accordingly, it is an aspect of the present invention to provide a bread maker comprising a door combination structure that is simplified and secure.

The foregoing and/or other aspects of the present invention are achieved by providing a bread maker comprising: a frame; a bracket combined to a side part of the frame and formed with a combining hole; a door provided in front of the frame; and a door hinge combined to the door and formed with a combining projection that is rotatably combined to the combining hole of the bracket to allow the door to rotatably open and close.

According to an aspect of the invention, a plurality of brackets and a plurality of door hinges are provided.

Moreover, according to another aspect of the invention, the bread maker further comprises a side cover attached to the side part of the frame and provided with a breakaway-prevention part supporting an upper surface of the door hinge to prevent the door hinge from an upward breakaway.

According to an aspect of the invention, the side cover is formed with a block-free part to allow the door hinge to rotate without being blocked.

It is yet another aspect of the invention to provide the block-free part with a slit shape.

Additional aspects and advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the preferred embodiments, taken in conjunction with the accompanying drawings of which.

DETAILED DESCRIPTION OF THE PREFERRED EMBODIMENTS

Figure 1:
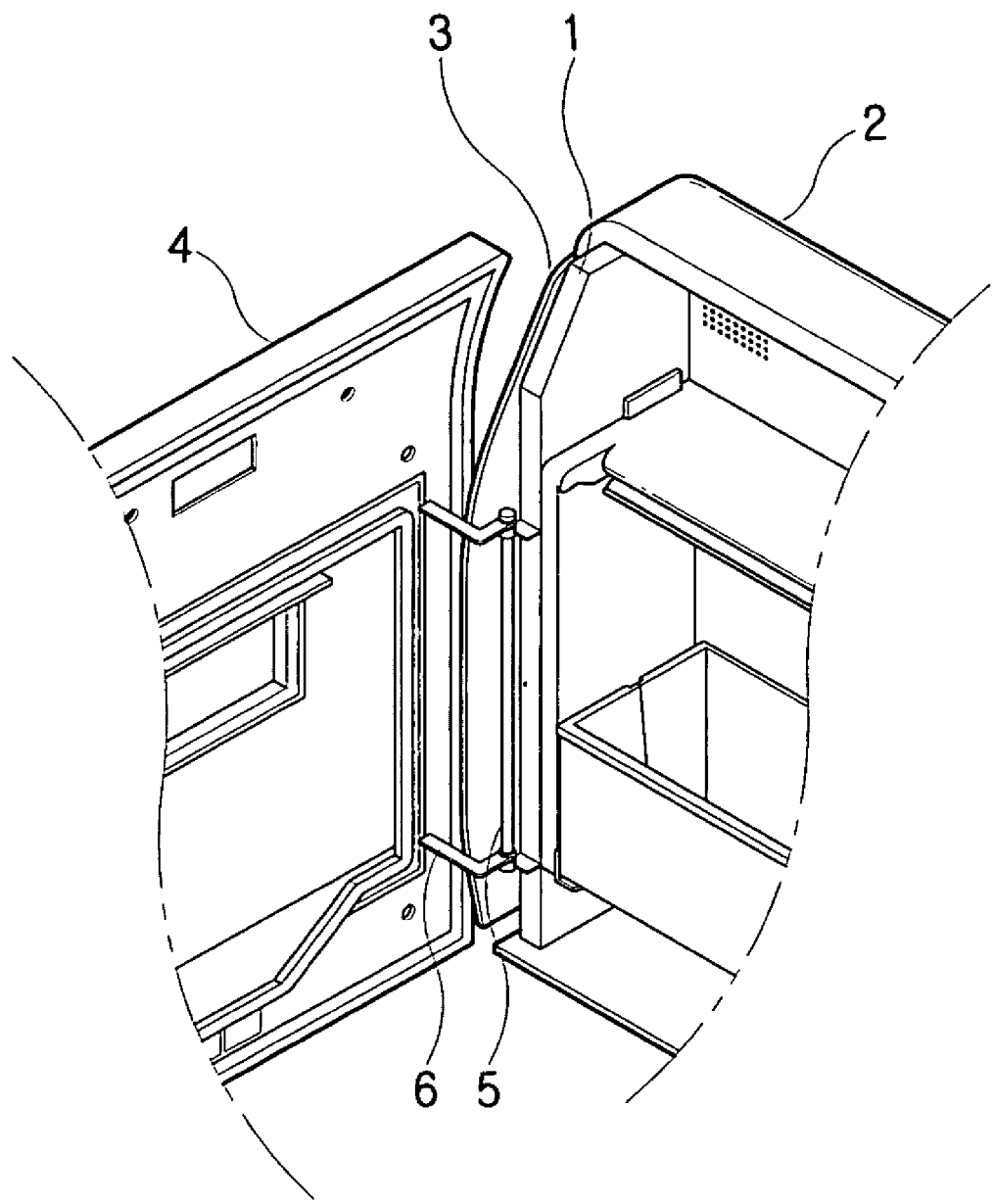
FIG. 1 is a perspective view of a door combination structure of a conventional bread maker.

Reference will now be made in detail to the present preferred embodiments of the present invention, examples of which are illustrated in the accompanying drawings, wherein like reference numerals refer to the like elements throughout. The embodiments are described below in order to explain the present invention by referring to the figures.

Figure 2:
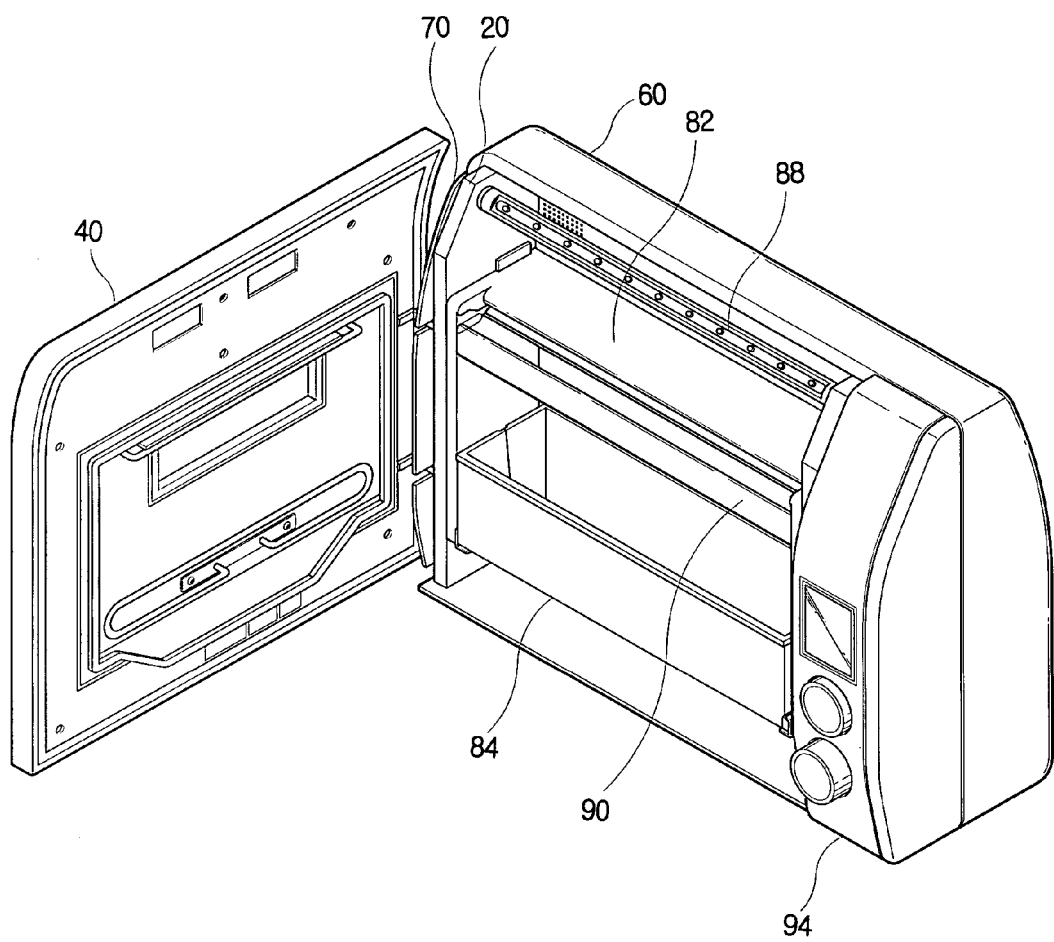
FIG. 2 is a perspective view of a bread maker according to an aspect of the present invention.
Figure 3:
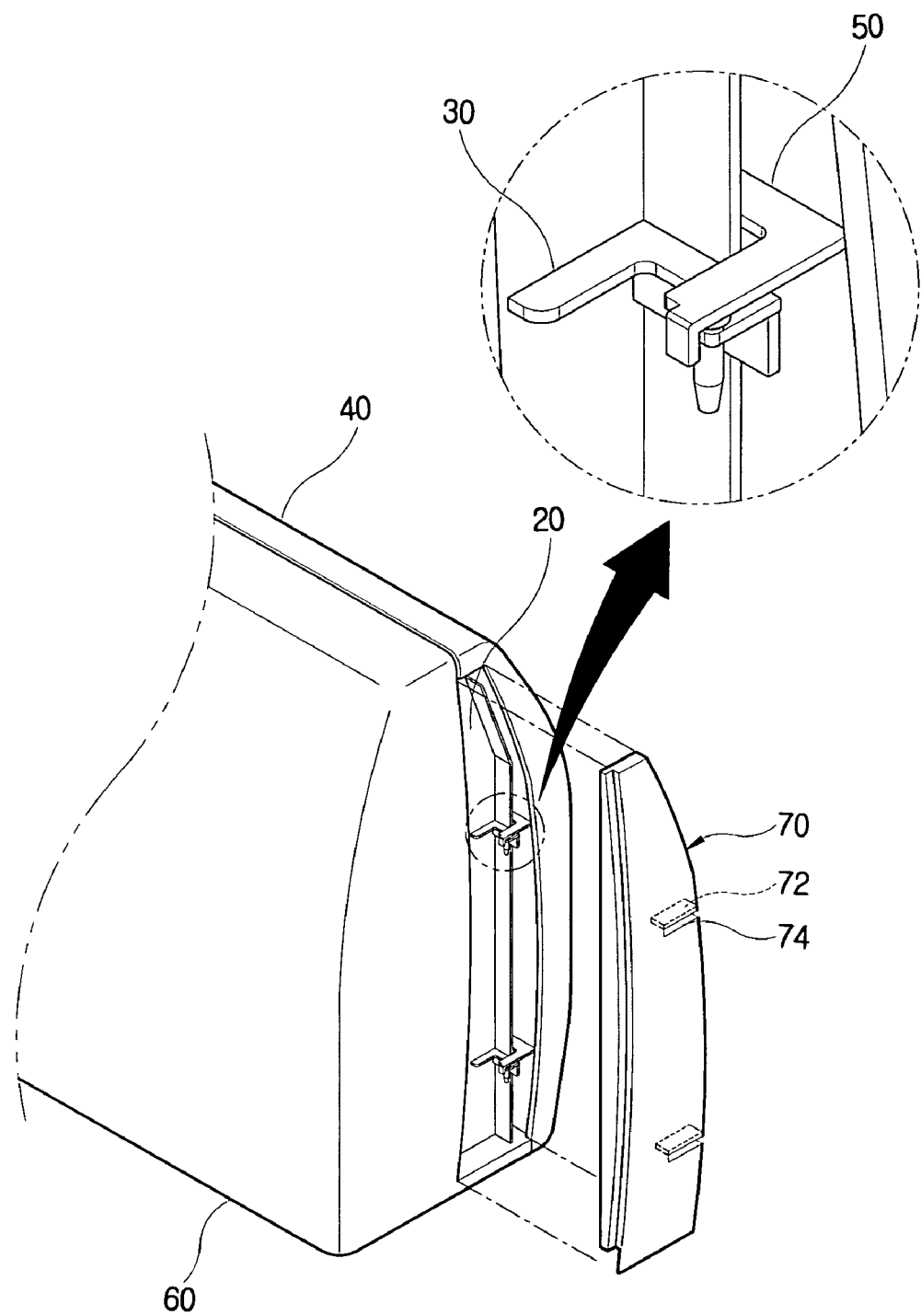
FIG. 3 is a perspective view of a door combination structure of the bread maker according to another aspect of the present invention.
Figure 4:
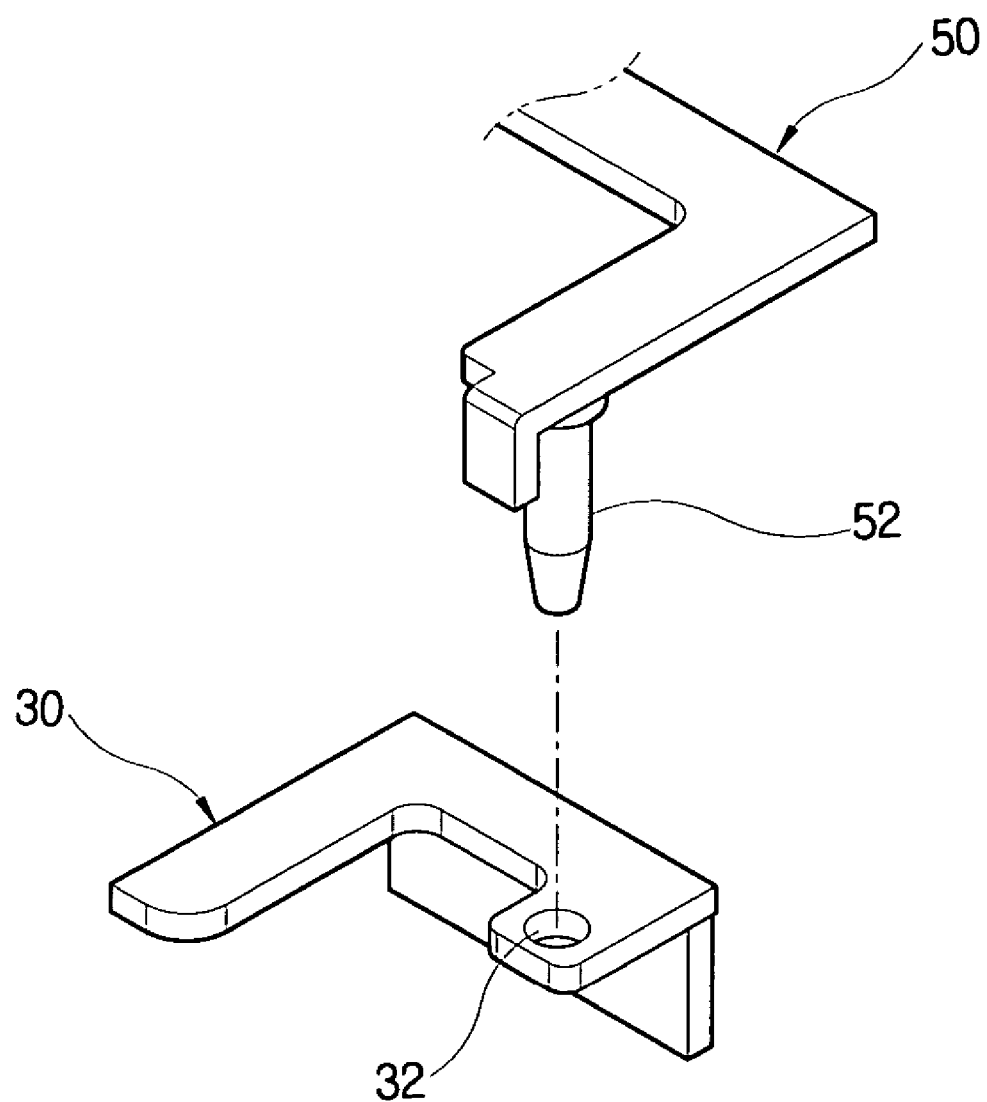
FIG. 4 is an enlarged perspective view of the door combination structure of shown in FIG. 3.
Figure 5:
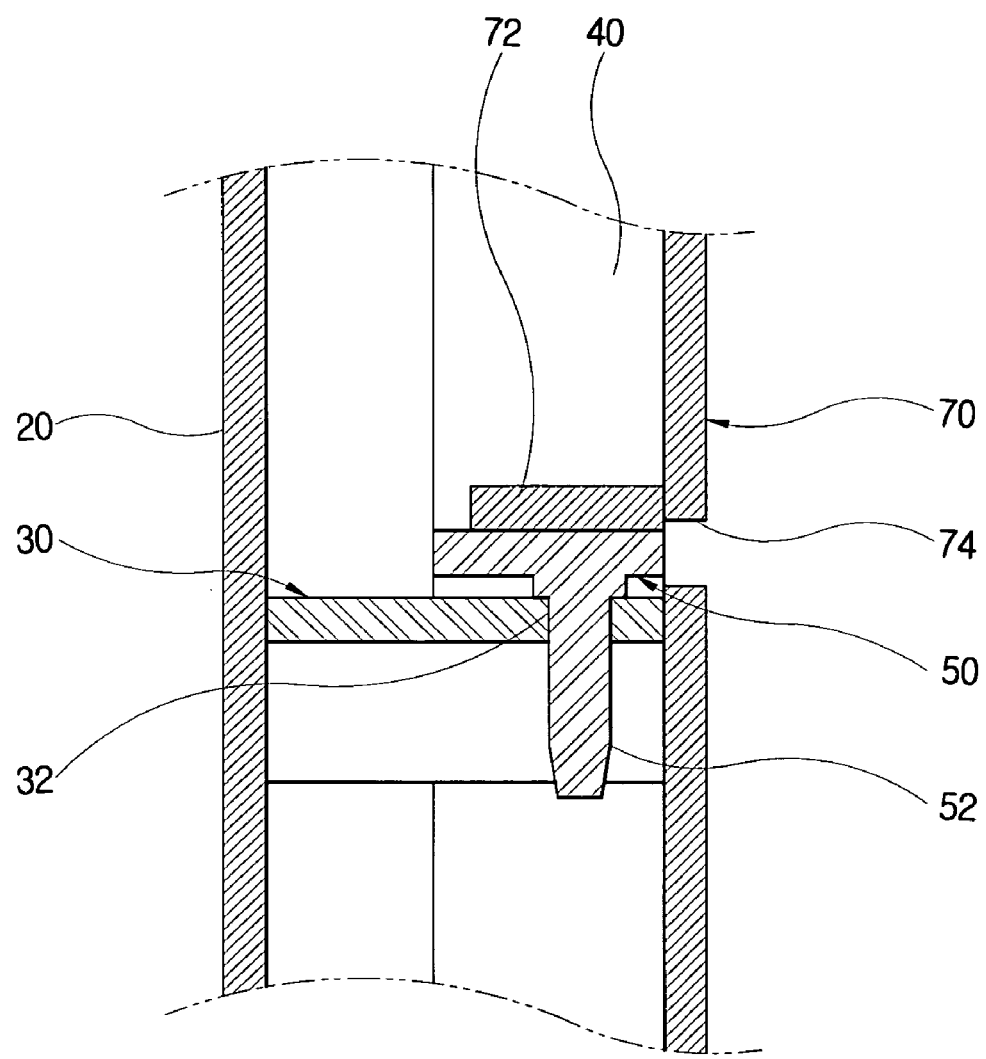
FIG. 5 is a sectional view of the door combination structure of the bread maker according to one aspect of the present invention.
Figure 6A:
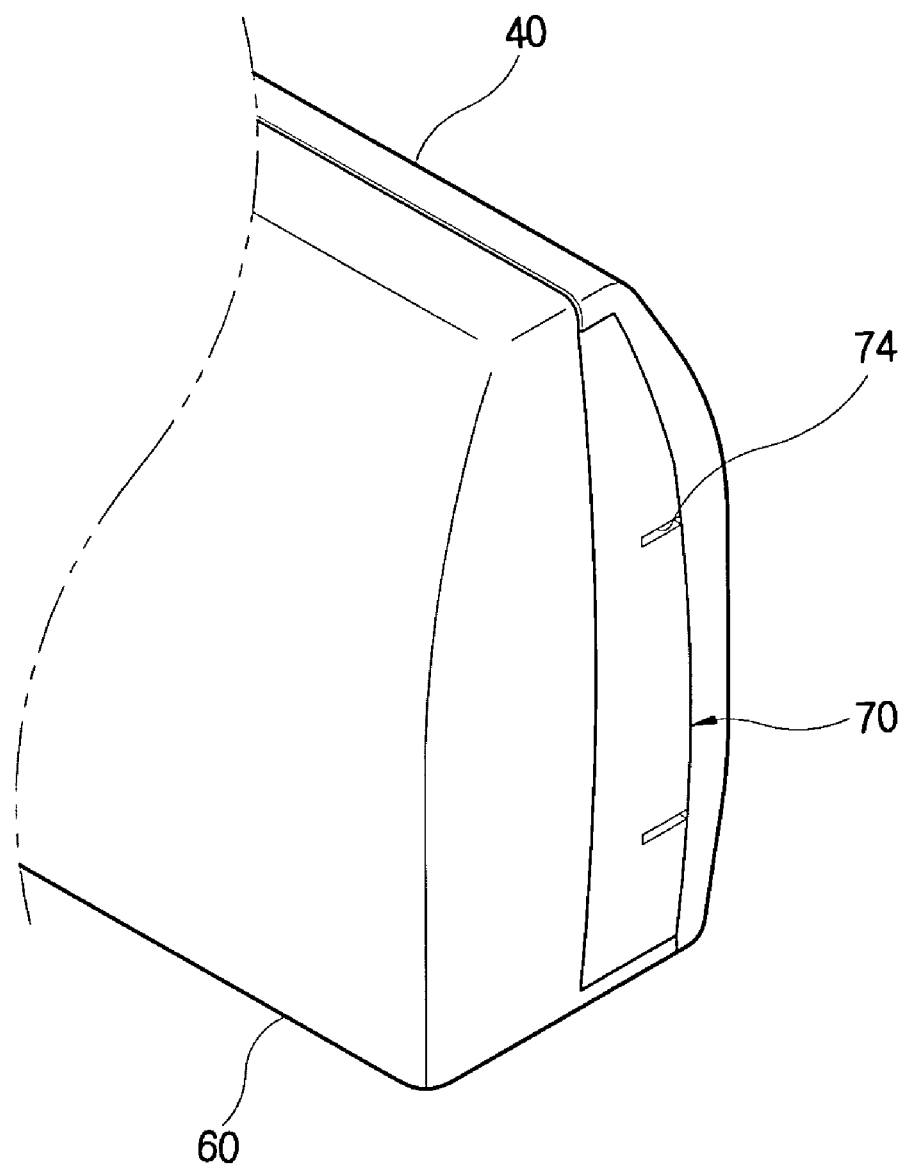
FIGS. 6A and 6B are perspective views to illustrate closed and opened states of a door, respectively, according to the bread maker according to an aspect of the present invention.
Figure 6B:
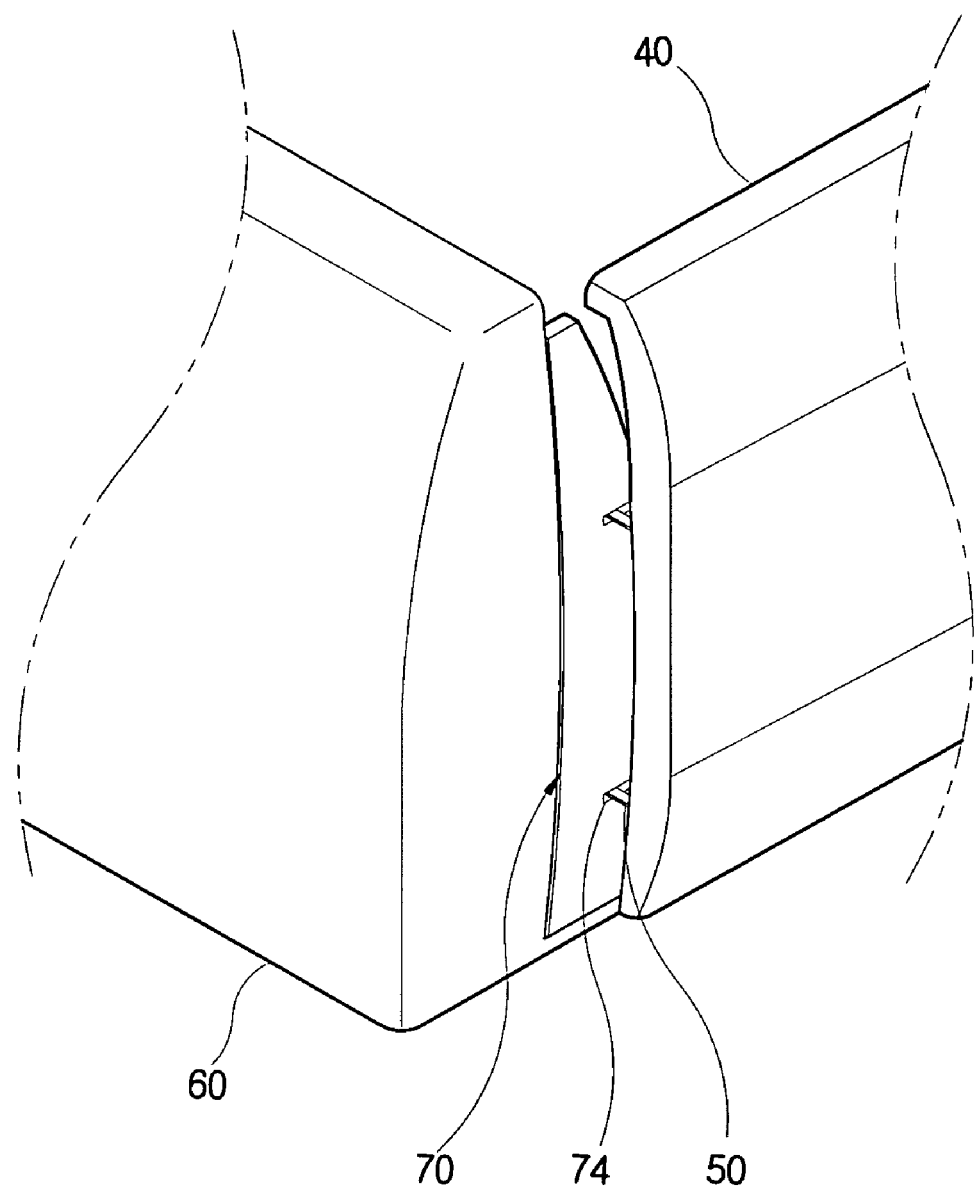

As shown in FIGS. 2 and 3, a bread maker according to an aspect of the present invention comprises a frame 20, a bracket 30 attached to a side part of the frame 20, a door 40 provided in the front of the frame 20, a door hinge 50 having a first end combined to the door 40 and a second end rotatably combined to the bracket 30 to allow the door 40 to open and close, a back cover 60 attached to a rear part of the frame 20, and a side cover 70 attached to the side part of the frame 20 and formed with a breakaway-prevention part 72 supporting an upper surface of the door hinge 50 to prevent the door hinge 50 from an upward breakaway.

The frame 20 forms an oven compartment in which an oven 82 is accommodated, and a panel installation part in which a control panel 94 is mounted.

Inside the oven 82 towards the upper and lower portions of the oven, an upper kneading drum 88 and a lower kneading drum (not shown) are provided, respectively. The upper kneading drum 88 and the lower kneading drum (not shown) are disposed parallel to each other, and alternate clockwise and counterclockwise rotations. On the upper kneading drum 88 and the lower kneading drum are wound opposite ends of a mixing bag (not shown) filled with ingredients for the bread, respectively. Between the upper kneading drum 88 and the lower kneading drum is provided a pair of dough-blocking members 90 to prevent dough being kneaded in the mixing bag from moving toward the upper kneading drum 88. Further, a baking tray 84 is placed in the oven 82, which is shaped like a box having a top opening to contain the completely kneaded dough.

The bracket 30 and the door hinge 50 are employed to allow the door 40 to rotatably open and close. The side cover 70, which keeps the door hinge 50 combined with the bracket 30, is formed with a block-free part 74 to allow the door hinge 50 to rotate without being blocked when the door 40 is being opened and closed.

An opening angle of the door 40 is determined depending upon the length of the block-free part 74 of the side cover 70.

The block-free part 74 can have a variety of shapes, within range, not to allow blocking of the door hinge 50 while the door 40 is being opened and closed. In this embodiment, the block-free part 74 preferably has a slit shape.

As shown in FIGS. 4, 5, 6A and 6B, the door 40 combines with the door hinge 50 having a combining projection 52, and the frame 20 combines with the bracket 30 having a combining hole 32, wherein the combining projection 52 is rotatably inserted into the combining hole 32, thereby allowing the door 40 to rotatably open and close.

The door hinge 50 is L-shaped and is curved outward, thereby causing the combination between the door 40 and the door hinge 50 to be relatively light in comparison to the weight of the door 40. According to an aspect of the present invention, the size and the shape of the bracket 30 and the door hinge 50 can be changed as necessary.

To make the combining projection 52 of the door hinge 50 easily combine with and easily separable from the combining hole 32, the combining projection 52 of the door hinge 50 is directly inserted into the combining hole 32 of the bracket 30. Accordingly, when the door 40 is rotated, the combining projection 52 is likely to break away from the combining hole 32 upwardly.

Accordingly, inside an inner surface of the side cover 70 attached to the side part of the frame 20 is the breakaway-prevention part 72 that has a plate shape adapted to support the upper surface of the door hinge 50. Therefore, the door hinge 50 is prevented from the upward breakaway.

The breakaway-prevention part 72 is provided adjacent to the block-free part 74 formed on the side cover 70. The size and the shape of the breakaway-prevention part 72 can vary within range to support the upper surface of the door hinge 50.

Further, a plurality of the bracket 30 and the door hinge 50 may be provided as necessary, thereby securing the combination of the bracket 30 and the door 50.

As described above, an aspect of the present invention provides a bread maker in which a door combination structure is simplified and secured, thereby enhancing assembly efficiency and decreasing production cost.

Further, one aspect of the present invention provides a bread maker in which a bracket is covered with a side cover when the door is opened, thereby simplifying the exterior appearance of the bread maker.

Although a few preferred embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A bread maker having a heating system, comprising:
    a frame forming a compartment in which an oven is accommodated, the heating system generating heat in the oven to make bread from dough;
    a bracket formed with a combining hole, the bracket being combined to a side part of the frame;
    a door provided in front of the frame;
    a door hinge formed with a combining projection that is rotatably combined to the combining hole of the bracket to allow the door to rotatably open and close, the door hinge being combined to the door;
    a side cover attached to the side part of the frame; and
    a breakaway-prevention part provided to the side cover to support an upper surface of the door hinge to prevent the door hinge from an upward breakaway.

2. The bread maker according to claim 1, wherein the side cover is formed with a block-free part to allow the door hinge to rotate without being blocked.

3. The bread maker according to claim 2, wherein the block-free part has a slit shape.

4. The bread maker according to claim 3, wherein the breakaway prevention part has a plate shape adapted to support the upper surface of the door hinge.

5. A bread maker having a heating system comprising:
    a frame forming a compartment in which an oven is accommodated, the heating system generating heat in the oven to make bread from dough;
    a bracket attached to a side of the frame;
    a door provided covering a front portion of the frame;
    a door hinge having a first end combined to the door and a second end rotatably combined to the bracket; and
    a side cover attached to the side part of the frame and adapted to keep the door hinge combined with the bracket during rotation,
    wherein the side cover is formed with a breakaway prevention part to support an upper surface of the door hinge and attached to the side part of the frame.

6. The bread maker according to claim 5, wherein the side cover keeps the door hinge combined with the bracket.

7. The bread maker according to claim 6, wherein the side cover is formed with a block-free part to allow the door hinge to rotate without being blocked.

8. The bread maker according to claim 7, wherein the length of the block-free part of the side cover determines an opening angle of the door.

9. The bread maker according to claim 7, wherein the block-free part has a slit shape.

10. The bread maker according to claim 5, wherein the door hinge has an L-shape.

11. The bread maker according to claim 5, wherein the breakaway prevention part has a plate shape adapted to support the upper surface of the door hinge.

12. The bread maker according to claim 5, wherein the side cover is formed with a block-free part to allow the door hinge to rotate without being blocked.

13. A bread maker having a heating system, comprising:
    a frame forming a compartment in which an oven is accommodated, the heating system generating heat in the oven to make bread from dough;
    a bracket attached to a side of the frame;
    a side cover attached to a side part of the frame;
    a door hinge having a first end combined to a door provided to the bread maker, and second end rotatably combined to the bracket; and
    a breakaway-prevention part provided to the side cover to support an upper surface of the door hinge to prevent the door hinge from an upward breakaway.

14. A bread maker including a heating system and a frame forming a compartment in which an oven is accommodated, the heating system generating heat in the oven to make bread from dough, comprising:
    a door provided to a front portion of the bread maker;
    a bracket attached to a side of the frame;
    a door hinge having a first end combined to the door and second end rotatably combined to the bracket; and
    a side cover attached to a side part of the frame and provided with a breakaway-prevention part to support an upper surface of the door hinge and to cover the bracket.

* * * * *

UNITED STATES PATENT AND TRADEMARK OFFICE
CERTIFICATE OF CORRECTION

| | | |
|---|---|---|
| PATENT NO. | : 7,246,553 B2 | Page 1 of 1 |
| APPLICATION NO. | : 10/804052 | |
| DATED | : July 24, 2007 | |
| INVENTOR(S) | : Jae-ryong Park et al. | |

It is certified that error appears in the above-identified patent and that said Letters Patent is hereby corrected as shown below:

Column 4, Line 9, change "3," to --1,--.

Signed and Sealed this

Fourth Day of December, 2007

JON W. DUDAS
*Director of the United States Patent and Trademark Office*